E. M. STILES.
MEAT STACKER.
APPLICATION FILED SEPT. 12, 1912.

1,231,959.

Patented July 3, 1917.
3 SHEETS—SHEET 1.

Witnesses:
R. Bauer
W. T. Kilroy

Inventor:
Edward M. Stiles
By [signature]
Atty.

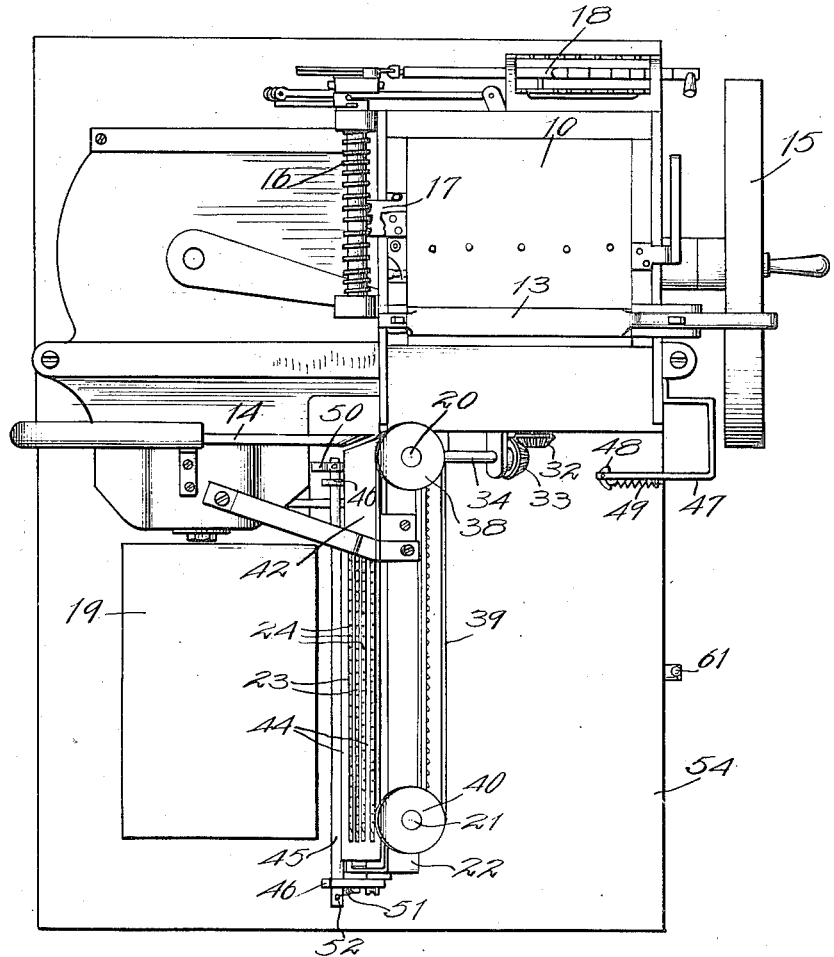

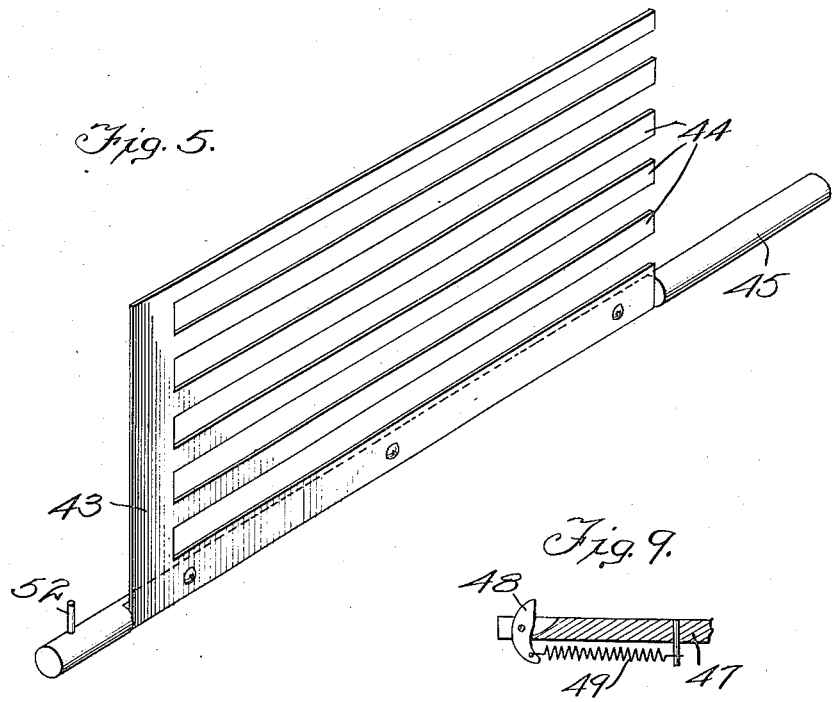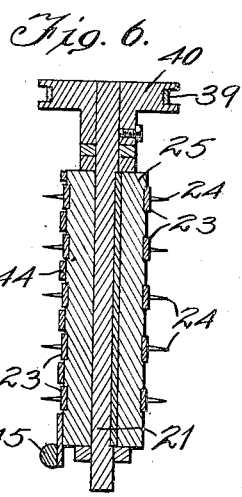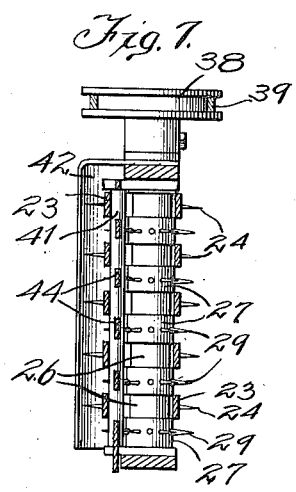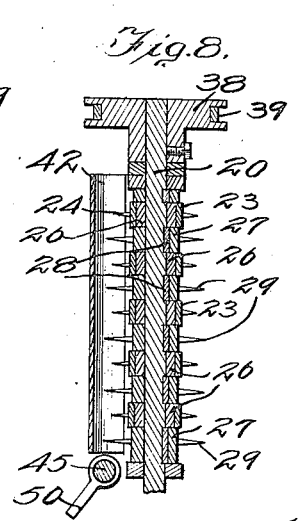

UNITED STATES PATENT OFFICE.

EDWARD M. STILES, OF MOUNT PLEASANT, IOWA, ASSIGNOR TO U. S. SLICING MACHINE COMPANY, OF CHICAGO, ILLINOIS, A CORPORATION OF ILLINOIS.

MEAT-STACKER.

1,231,959.     Specification of Letters Patent.    Patented July 3, 1917.

Application filed September 12, 1912. Serial No. 719,955.

*To all whom it may concern:*

Be it known that I, EDWARD M. STILES, a citizen of the United States, residing at Mount Pleasant, in the county of Henry and State of Iowa, have invented certain new and useful Improvements in Meat-Stackers, of which the following is a specification.

This invention relates to improvements in meat stackers for stacking slices of meat as they are delivered by the meat slicer and is more particularly adapted, though not necessarily limited in its use, in connection with any of the well known types of meat slicers wherein the slices are cut from a block of meat and the meat is adjusted transversely of the cutting plane of the knife, after each cut.

One of the objects of the invention is to provide an improved meat stacker of this class having means for collecting and stacking the slices as they are cut, thereby obviating the necessity of gathering by hand and stacking the slices, which as they are cut have heretofore fallen into a collecting box or receiver.

A further object is to provide an improved machine of this class, having means for holding the slices in such a manner that from the time they are cut until they are stacked they will not be distorted nor stretched.

A further object is to provide an improved machine of this class having a collector support upon which the slices are stacked and means whereby the support will be automatically adjusted as the slices are stacked thereon, and as the size of the stack increases, so that the receiving face of the stack will be always maintained in substantially the same position.

A further object is to provide an improved machine of this class which will be simple, durable and comparatively cheap in construction and effective and efficient in operation.

To the attainment of these ends and the accomplishment of other new and useful objects as will appear, the invention consists in the features of novelty in substantially the construction, combination and arrangement of the several parts hereinafter more fully described and claimed, and shown in the accompanying drawings exemplifying the invention, and in which;

Fig. 3 is a top plan view of the parts shown in Figs. 1 and 2.

Fig. 4 is a detail horizontal sectional view taken on the line 4—4, Fig. 2.

Fig. 5 is a detail perspective view of the "fly" or member for transferring the slices from the receiver to the collector table or support.

Fig. 6 is a detail sectional view on line 6—6, Fig. 4.

Fig. 7 is a detail sectional view on line 7—7 Fig. 4.

Fig. 8 is a detail sectional view on line 8—8, Fig. 4.

Fig. 9 is a view partly in section showing another detail.

Figure 1:
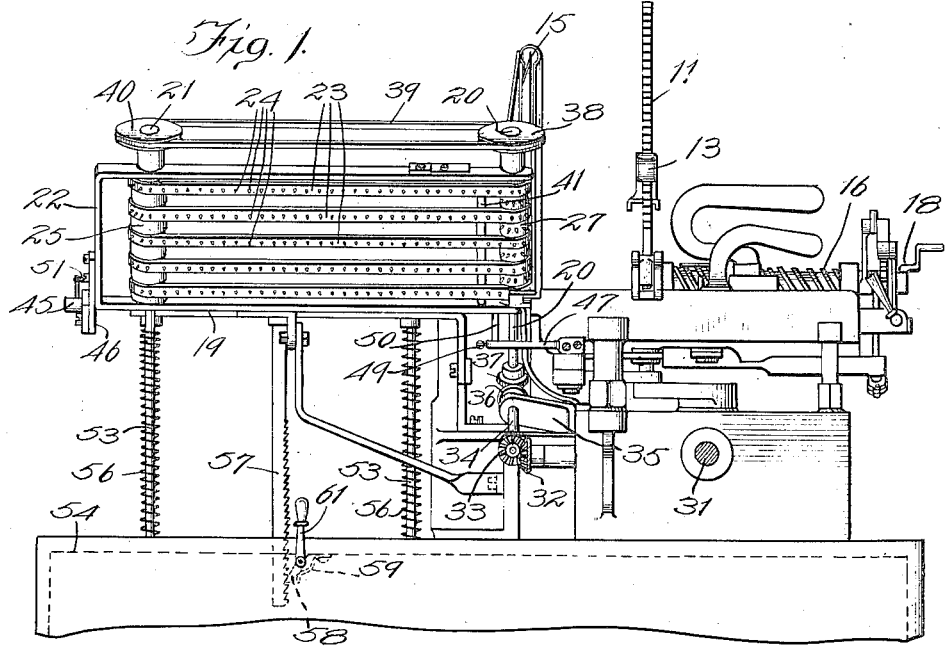
Figure 1 is a side elevation of an improved machine of this class constructed in accordance with the principles of this invention, and showing the same as applied to a well known type of meat cutter, the latter being partly in section.

The ordinary type of meat cutter, and to which this present invention is particularly adapted, is provided with a sidewise movable carriage on which the block of meat is secured and which carriage may be advanced backwardly and forwardly, or relatively with respect to a suitable knife or cutter, so as to bring the face of the block of meat consecutively into contact with the cutter and thus sever the slices of meat from the block. Suitable mechanism is provided for advancing the carriage and its block of meat the desired amount toward the knife or cutter during each stroke so as to always sever the slice of meat from the block which slice will be of the proper thickness. Suitable mechanism is also provided for advancing the carriage back and forth, for advancing the carriage toward the knife or cutter and for rotating the knife or cutter if that should be desired.

In the present embodiment of this invention, there is provided a collector support adjacent the meat cutter, adapted to receive the slices of meat as they are severed. A receiver of suitable construction and preferably in the form of a carrier is also provided for receiving each individual slice of meat as it is severed, to carry the same away from the cutter and means are also provided for transferring each slice from the receiver to the collector support after the slice has been completely severed. In order to compensate for the continuous increase in size of the stack of meat formed by the slices stacked together on the collector support, the latter is mounted in such a way that it is adjustable and means are provided for automatically adjusting the collector support after each slice of meat has been placed thereon, a distance substantially equal to the thickness of the slice last severed. In this way the receiving face of the stack will always be maintained at substantially the same point.

Referring now to the drawings, the platform of the meat holder is designated generally by the reference numeral 10 and is provided with the usual uprights 11, preferably one or both of which may be pivoted to the platform as at 12, and is provided with a cross bar 13, which latter may be forced down against the top of the block of meat to clamp the same firmly to the carriage. Means are also provided for moving the carriage backwardly and forwardly behind the cutter 14, which latter is preferably in the form of a disk and preferably rotates during the cutting stroke so as to better sever the slice of meat from the piece. In the particular construction illustrated a hand wheel 15 serves as a source of power for imparting a relative movement to the carriage and disk. However, such constructions are well known in the art and inasmuch as they form no part of the present invention, further specific description thereof is not necessary.

Figure 2:
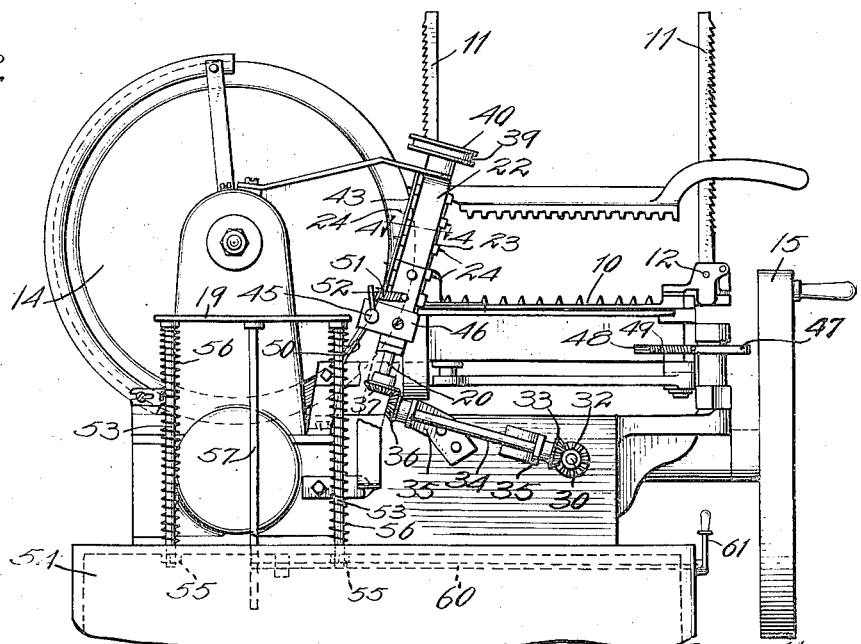
Fig. 2 is a front elevation of the construction shown in Fig. 1 and as viewed from the left of Fig. 1.

Each time the carriage is returned to its normal position, as shown in Figs. 2 and 3, it is advanced forwardly, a predetermined distance so that the piece of meat will protrude out into the line of the cutting disk, and thus insure the severing of a given thickness of meat on the next stroke. In the particular construction illustrated, this advancing mechanism embodies a feed screw 16, which engages a grooved finger or projection 17 and which screw is rotated by any suitable mechanism a slight amount as the carriage is returned to its initial position, the degree of rotation of this screw being regulated by suitable controlling mechanism 18, which is also well known in the art and are only illustrated and described in the present application for the purpose of showing the relation with which this improved meat stacker bears to a well known form of meat cutter.

The meat stacker comprises a collector support 19 which is preferably arranged so as to be adjusted upwardly and downwardly and is placed adjacent the meat cutter, and the receiver, which in the present form of the invention comprises a carrier in the form of endless belts, is also provided for receiving and carrying the individual slices of meat away from the cutting disk as they are severed.

The receiver or carrier in the present form of the invention comprises spaced upright shafts 20, 21, arranged parallel with each other and mounted in suitable bearings in a suitably supported frame 22. The shafts 20 and 21 are arranged at an incline to the vertical, that is, they are tilted backwardly at their upper extremities toward the carriage and in a direction away from the cutter 14. The support or frame 22 for these shafts is preferably arranged to extend outwardly beyond the front face of the cutter 14 and in a direction transverse to the plane of rotation of the cutter. The receiver or carrier is in the form of endless belts 23, having spaced teeth or spikes 24 projecting from the outer face thereof. Any number of these endless belts 23, may be provided and are constructed of any suitable flexible material. Arranged on the shaft 21 and secured thereto for rotation therewith, is a pulley 25 which is provided with a series of spaced peripheral grooves spaced longitudinally of the shaft and into which the belts 23 run, one groove being provided for each of the belts. Mounted loosely upon the other shaft 20 are a series of pulleys 26 which are of a diameter less than the diameter of the pulley 25 and one of these pulleys 26 is provided for each of the belts 23, as shown more clearly in Figs. 7 and 8. The pulleys 26 are spaced longitudinally of the shaft 20 and arranged intermediate each pair of pulleys 26 is a sleeve or collar 27 and these sleeves or collars are secured to the shaft 20 so as to rotate therewith in any desired or suitable manner such as by means of a fastening key or feather 28. The sleeves or collars 27 are also provided with spaced radially projecting prongs or teeth 29 and these prongs or teeth 29 are of a length slightly greater than the prongs or teeth 24 on the belts 23, for the purposes to be hereinafter set forth. With this construction it will be manifest that when the shaft 20 is rotated the sleeves or collars 27 and the prongs or teeth 29 will be rotated therewith, while the pulleys 26 over which the belts 23 pass will have a rotary movement with respect to the shaft 20.

Motion is imparted to one of the shafts, preferably the shaft 20, in any suitable manner from the main shaft of the machine, or the shaft to which the hand wheel 15 is connected. This is accomplished by means of a suitable shaft 30 which is geared to the main shaft 31 in any suitable manner and is provided with a gear 32 (see Figs. 1 and 2) which latter meshes with a gear 33 on another shaft 34 mounted in suitable bearings 35 and this shaft 34 has in turn a gear 36 which meshes with a gear 37 on shaft 20. Secured also to the shaft 20 for rotation therewith and preferably at the upper extremity of the shaft, is a pulley 38 over which a drive belt 39 passes and this belt 39 also passes over another pulley 40 which is secured to the shaft 21 so that the motion imparted to the shaft 20 will be conveyed to the shaft 21. It will be manifest that the shaft 20 is directly driven from the main shaft of the machine and when rotated the shaft 20 will rotate the sleeves or collars 27 and also the pulley 38. As the pulley 38 is rotated, its motion will be imparted to the pulley 40 through the medium of the belt 39. The pulley 40, being secured to the shaft 21, and the pulley 25, being also secured to the shaft 21, the latter will be rotated by the shaft 21 and the rotation of this pulley 25 will impart motion to the belts 23, and as the belts are driven the pulleys 26 will rotate freely about the shaft 20. With this arrangement it will be manifest that the belts and the sleeves or collars 27 are not only rotated in the same direction, but it is possible to impart a different speed of rotation between the sleeves or collars 27 and the belts 23. The shaft 20 is located in close proximity to the cutter 14 and inasmuch as the prongs 29 are of a greater length than the prongs 24, the slice just as it is cut will be picked up by the prongs 29 and will be carried around to the front of the receiver or conveyer. The prongs 29 hold the slice away from contact with the prongs 24 while the slice is being carried around the shaft 20. In this way distortion of the slice is prevented since the prongs 29 maintain a fixed position relative to one another and do not shift their relative position as do the prongs 24. Unless means were provided to prevent the slices from becoming stretched or distorted as they pass around the rollers 23, they could not be stacked evenly nor would a uniform stack result. In order to compensate for the increased speed of the points of the prongs 29 due to the length of the prongs and to hold the slices from buckling where they are transferred from these prongs to the prongs 24 a differential speed is given to the sleeves or collars 27 carrying the prongs 29 and the belts 23 carrying the prongs 24. The driving mechanisms and pulleys are so arranged that the surface speed of the belts carrying the prongs 24 is slightly greater than the surface speed of the sleeves or collars 27 carrying the prongs 29. This variation or difference in speed may be of any desired extent, but in practice it has been found that good results can be obtained by permitting the belts to travel a distance of about 13 inches while the sleeves or collars are traveling about 12 inches. The prongs on the sleeves or collars will pick up the slice first and just as the slice is passing over the pulleys, the prongs on the belts will also pick up the slice and traveling at a little greater rate of speed than the sleeves or collars, it will hold the slice in proper position. At the same time the severed portion of the slice will be carried away from the cutter and thereby prevent such severed portion from adhering to the cutter.

A guide 41 (see particularly Figs. 4 and 7) is provided adjacent the shaft 20, over which one run of the belts pass so as to permit the prongs 29 to become disengaged from the slice as the slice is carried away from the cutter by the belts and thereby prevent injury to the slice. A shield 42 is also provided adjacent the shaft 20 and at the point where the slice is severed by the cutter and beneath which the slice as it is severed passes.

The receiver thus constructed constitutes a conveyer as herein specifically described, but the specific construction thereof, *per se*, constitutes the subject matter of a separate application which is a division of the present application. This receiver or conveyer is arranged adjacent the collector support 19 as shown more clearly in Figs. 2 and 3, and the normal position of the collector support 19 is just beneath the lowermost belt and the collector support is arranged in front of the receiver or carrier so that the latter will incline away from the support.

In order to deposit the slices on to the collector support 19 so as to stack them thereon, means must be provided for removing the slice from the belts or receiver and for disengaging them from the prongs 24. Any suitable means may be provided for this purpose but a simple and efficient means which has been found efficient in practice comprises what will hereinafter be designated a "fly" indicated generally by the reference numeral 43. This fly comprises a body portion having a series of spaced fingers 44 and is secured or mounted upon a shaft 45 which latter is journaled in suitable bearings 46 arranged preferably at the lower edge of the receiver or carrier. The fingers 44 are spaced from each other as are also the belts 23, so that one finger will stand in the space between each pair of belts as is shown more clearly in Figs. 3, 4 and 7, and the fingers are of such a length that they will terminate short of the shaft 20 and also short of the guide 41. When the fingers are in position between the belts, their outer faces will be below the extremities of the prongs 24 on the belts, (see particularly Fig. 6) so as to permit the slice to be carried by the receiver or carrier over the faces of the fingers. When the slices have reached the proper position on the receiver, with respect to the collector support 19, the fly is dumped or shifted so that it will remove or lift the slice from the belts and will deposit them on the collector support 19.

Any suitable means may be provided for dumping the fly, but a suitable and efficient means comprises an arm 47 which is preferably carried by the reciprocating meat carrier. This arm carries a dog 48 pivotally connected thereto and is controlled by the spring 49. The dog is what might be termed a one way dog, that is, when the carriage moves in one direction it will engage an arm 50 on the shaft 45 and will yield so as to pass the arm without rocking the shaft 45. This, in the present form of the invention, occurs during the forward movement of the carriage or while the slice is being cut. When the carriage returns to its normal position, the dog 48 will engage the arm 50 on the shaft 45 and rock the latter in its bearings. This will dump the fly 43 so that the slice will be removed from the receiver and deposited onto the collector support. The dumping movement of the fly is in opposition to the stress of an elastic member 51 which is anchored at one end to a fixed support and is connected at its other end to a projection 52 on the shaft so that after the fly has been dumped and the dog 48 has moved out of engagement with the arm 50 on the return movement of the carriage, the elastic member 51 will return the fly to its normal position.

It is obvious that unless means are provided for adjusting the collector support 19 as the slices are stacked thereon, a suitable distance after each slice of meat has been deposited thereon, eventually the stack of slices would become so large that the movement of the fly would be interfered with, and the slices would not be properly stacked. To overcome this difficulty, the collector support 19 is of such a construction that it may be automatically adjusted and is also preferably so arranged that this automatic adjustment will be effected by the movement of the fly, that is, each time a slice is deposited by the fly, the movement of the fly or pressure against the support through the slice will effect this adjustment. In order to accomplish this, the support 19 is carried by a number of uprights 53 movable in suitable guides, preferably by passing through holes or openings in the base 54 of the machine, and nuts or collars 55 are provided on the uprights to limit the upward movement of the support. These uprights are of any desired or suitable length, but preferably of a length that the normal position of the collector support 19 will be adjacent to the bottom of the receiver or carrier, and elastic members 56 preferably in the form of coiled springs surround the uprights and tend normally to move the support 19 to its normal position.

It is obvious that it would be possible to so proportion the springs or elastic members 56 that the collector support 19 would automatically or naturally retain its adjusted position by the deposit of a slice hereon and each time it is lowered by the action of the fly in depositing the slice. However, in order to insure that the support will maintain its lowered position, or the position to which it has been forced by the fly, there is provided retaining means which preferably comprises a rack bar 57 which passes through a suitable guide or opening in the base 54 and a pawl 58 controlled by a spring 59. The pawl coöperates with the teeth 57 of the rack so that each time the collector support is adjusted by the deposit of a slice thereon, the pawl 58 will yield and will then lock the support against return movement under the stress of the springs 50. In order to permit the support to return to its normal position, a tripping means, preferably in the form of a rock shaft 60 having a handle 61 secured thereto and located in a convenient position for the operator, is provided so that the pawl 58 may be lifted out of engagement with the teeth of the rack and when thus released the support 19 will be moved by the springs back to its normal position.

Obviously, the springs 56 must be of sufficient strength to prevent the collector support 19 from dropping of its own weight in connection with the weight of the slices and it must also be of a strength that it will only move a distance substantially equal to the thickness of the slice being deposited thereon, while at the same time it should not be of such a strength that it would not be adjusted by the fly.

It will be manifest that with this construction the slices will be uniformly stacked and at the same time the fly will operate as a presser not only to move the collector support 19, but also to serve as a means for packing the slices as they are stacked.

Obviously, the support or frame 22 may be held in position in any desired or suitable manner and braces and supports may also be provided wherever it is found necessary.

While in the present exemplification of the invention the preferred form of construction is herein shown, it is to be understood that many changes may be made in the details of construction and arrangement of the several parts, within the scope of the claims, and without departing from the spirit of the invention, The term "fly" as used in the specification and claims in this case is to be considered in its broadest interpretation, that is, to mean any mechanism for lifting or dumping or even conveying the slices from the receiver or carrier and depositing them upon the collector support.

It is also to be understood that while the present exemplification of this invention is shown, described and claimed, in connection with a meat slicing machine, the invention is well adapted for use with machines for slicing other articles, with equal efficiency, and therefore, the terms meat slicer and meat slices as employed in the specification and claims are not to be considered as words of limitations.

What is claimed as new is:—

1. In combination, a slicer, a belt conveyer for receiving slices from said slicer, and means for preventing distortion of said slices as said conveyer changes its direction of travel.

2. In combination, a slicer, a belt conveyer having spikes thereon for receiving slices from said slicer, and means for holding said slices out of contact with said spikes at points where said conveyer changes its direction of travel.

3. In combination, a slicer, a belt conveyer having spikes thereon for transferring slices from said slicer in a plane at an angle thereto, and means separate from said conveyer for changing the plane of said slices from that in which they are delivered from said slicer to that in which they are transferred by said conveyer.

4. In combination with a slicer, a movable device having spikes thereon in fixed relation with one another for receiving slices from said slicer, and a conveyer arranged at an angle to said slicer for receiving slices from said movable device.

5. In combination, a slicer, a spiked roller for receiving slices from said slicer, and a spiked conveyer for receiving said slices from said roller.

6. In combination, a slicer, a spiked roller for receiving slices from said slicer, a spiked conveyer passing around the axis of said roller, the spikes on said roller being of a greater length than the spikes on said conveyer so that the slices are held from contact with said conveyer during their passages about said roller.

7. In combination, a slicer, a movable member having spikes thereon in fixed relation with one another for receiving slices from said slicer, a conveyer belt having spikes thereon for receiving slices from said movable member, and means for driving said conveyer belt and movable member at different rates of speed.

8. In combination, a slicer, a roller having fixed spikes thereon for receiving slices from said slicer, a conveyer belt passing around the axis of said roller and having spikes thereon of less length than the spikes on said roller and arranged to receive the slices from said roller, and means for driving said roller at a greater rate of speed than said conveyer belt.

9. In combination, a slicing knife, a movable carriage for presenting material to said slicing knife, a spiked roller for contacting with said material to receive the slices as they are formed by said slicing knife, and a belt conveyer for receiving the slices from said roller.

10. In combination, a slicing knife, a movable carriage for presenting material to said slicing knife, a spiked roller for contacting with said material to receive the slices as they are formed by said slicing knife and to carry said slices into a plane at an angle to said slicing knife, and a belt conveyer for receiving the slices from said roller.

11. In combination, a slicing knife, a movable carriage for presenting material to said slicing knife, a spiked roller for contacting with said material to receive the slices as they are formed by said slicing knife, a conveyer belt passing around the axis of said roller and having spikes thereon of less length than the spikes on said roller for receiving the slices from said roller, a guide for directing the conveyer belt away from said roller, and means for driving said roller and conveyer belt at different rates of speed.

12. The combination of a slicer, a receiver for receiving the slices from the slicer, said receiver embodying coöperating movable elements, and means for moving one of said elements at a greater rate of speed than the other.

13. The combination of a slicer, a toothed carrier for receiving a slice from said slicer, a toothed element coöperating with the carrier, and means for simultaneously moving said carrier and element at different rates of speed.

14. The combination of a slicer, a toothed carrier for receiving a slice from said slicer, a toothed element coöperating with said carrier for transferring the slice from the slicer to the carrier, and a collector support upon which the slices are deposited from the carrier.

15. The combination of a slicer, a toothed carrier, a rotatable toothed element coöperating with the carrier for receiving the slices from the slicer, a support, and means for delivering the slices from the carrier to the support, said carrier and the axis of rotation of the said element being inclined to the vertical.

16. The combination of a slicer, a toothed carrier, a rotatable toothed element coöperating with the carrier, both operating to receive the slices from the slicer, and a shield coöperating with the carrier and the said element at the point where both engage the slice.

17. The combination of a cutter, a toothed carrier for receiving a slice from the cutter, a toothed element coöperating with the carrier, said carrier and element being arranged to engage the severed portion of the slice while the slice is being cut, said element coming into contact with said slice in advance of said carrier.

18. The combination of a cutter, a toothed carrier for receiving a slice from the cutter, and a toothed element coöperating with the carrier and said carrier and element operating at different rates of speed and both having simultaneous engagement with the severed portion of the slice while it is being cut.

19. The combination of a slicer, a movable receiver for receiving the slices from the slicer, said receiver embodying means for moving the severed portion of the slice out of engagement with the slicer and also embodying means coöperating with the first recited means for holding the slices against distortion, and means for imparting motion to the receiver.

20. The combination of a cutter, a toothed carrier for receiving a slice from said cutter, a toothed element coöperating with the carrier, said carrier and element being operable at different rates of speed, the severed portion of the slice being engaged by said element and carrier simultaneously while the slice is being transferred from said element to said carrier.

21. The combination of a slicing knife, a belt conveyer having teeth thereon for transferring slices away from said knife, means adjacent said knife for changing the direction of travel of said conveyer, and means for preventing distortion of the slices by movement of the teeth on said conveyer relative to one another during the change in direction of travel of said conveyer.

22. In combination, a slicing knife, a belt conveyer having teeth thereon for transferring slices away from said knife, means adjacent said knife for producing a turn in the direction of travel of said conveyer, and means for carrying slices around the turn in said conveyer out of contact with the teeth of said conveyer to prevent distortion of said slices by relative movement of said teeth.

23. In combination, a slicing knife, a belt conveyer having teeth thereon for transferring slices away from said knife, means adjacent said knife for changing the travel of said conveyer into a direction away from said knife, and a movable element having teeth thereon extending beyond the teeth of said conveyer and located at the turn in the direction of travel of said conveyer.

24. In combination, a slicing knife, a conveyer belt having teeth thereon for transferring slices away from said knife, a guide roller for said belt adjacent said knife for directing the travel of said belt away from said knife, an independently movable element located at the turn in the direction of travel of said belt and having teeth thereon arranged to extend beyond the teeth of said conveyer to hold the slices out of contact with said conveyer teeth while said slices are passing around said turn.

25. In combination, a slicing knife, a conveyer belt having teeth thereon for transferring slices away from said knife, a guide roller for said belt adjacent said knife for directing the travel of said belt away from said knife, an independently movable element located at the turn in the direction of travel of said belt and having teeth thereon arranged to extend beyond the teeth of said conveyer to hold the slices out of contact with said conveyer teeth while said slices are passing around said turn, and means for directing said conveyer away from said guide roller to cause said conveyer teeth to receive said slices from the teeth of said movable element.

In testimony whereof I have signed my name to this specification, in the presence of two subscribing witnesses, on this ninth day of September A. D. 1912.

EDWARD M. STILES.

Witnesses:
F. S. FINLEY,
ANNA CLARK.